(12) United States Patent
Lillestolen et al.

(10) Patent No.: US 11,829,229 B2
(45) Date of Patent: Nov. 28, 2023

(54) APPARATUS AND METHOD FOR DIAGNOSING NO FAULT FAILURE FOUND IN ELECTRONIC SYSTEMS

(71) Applicant: Hamilton Sundstrand Corporation, Charlotte, NC (US)

(72) Inventors: Kirk A. Lillestolen, East Hartford, CT (US); William E. Villano, Canton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/729,765

(22) Filed: Apr. 26, 2022

(65) Prior Publication Data

US 2023/0342236 A1    Oct. 26, 2023

(51) Int. Cl.
*G06F 11/07* (2006.01)
*G06N 3/04* (2023.01)
*G06F 11/30* (2006.01)

(52) U.S. Cl.
CPC ........ *G06F 11/0772* (2013.01); *G06F 11/079* (2013.01); *G06F 11/3041* (2013.01); *G06N 3/04* (2013.01)

(58) Field of Classification Search
CPC ............... G06F 11/0772; G06F 11/079; G06F 11/3041; G06N 3/04
See application file for complete search history.

(56) References Cited

U.S. PATENT DOCUMENTS

| | | | |
|---|---|---|---|
| 6,502,085 B1 | 12/2002 | Adibhatla et al. | |
| 7,100,084 B2 | 8/2006 | Unkle et al. | |
| 7,702,435 B2 | 4/2010 | Pereira et al. | |
| 8,374,745 B2 | 2/2013 | Zhang et al. | |
| 8,667,332 B2* | 3/2014 | Bharadwaj | G05B 23/0251 714/25 |
| 10,725,463 B1* | 7/2020 | Dixit | B64D 45/00 |
| 10,928,807 B2 | 2/2021 | Rashidi et al. | |
| 10,970,146 B2 | 4/2021 | Nayak et al. | |
| 11,237,545 B2 | 2/2022 | Das | |
| 2022/0050733 A1* | 2/2022 | Selvaraju | G06N 20/00 |

FOREIGN PATENT DOCUMENTS

WO    WO-2021059302 A2    4/2021

* cited by examiner

*Primary Examiner* — Nadeem Iqbal
(74) *Attorney, Agent, or Firm* — Locke Lord LLP; Scott D. Wofsy; Christopher J. Capelli (57) ABSTRACT

A computing method and device for detecting an anomaly event in a hardware-based machine learning anomaly event detector. Data is received from a plurality of input/output interfaces (I/O) or internal functions, wherein the received data of each I/O is associated with a certain sensor or effector. The received data from the plurality of I/O's is analyzed to determine the occurrence of an anomaly event for data from one of the plurality of I/O's. This analysis includes using machine learning techniques dynamically programmed to detect an anomaly event for the I/O data being analyzed by using predetermined parameter values. The predetermined parameter values are retrieved from memory, and are associated with the I/O data being analyzed. Stored in memory for subsequent analysis is at least a portion of the received data from the I/O data being analyzed accompanied with associated neural network output when it is determined an anomaly event occurred for the I/O data being analyzed using the machine learning techniques.

17 Claims, 4 Drawing Sheets

APPARATUS AND METHOD FOR DIAGNOSING NO FAULT FAILURE FOUND IN ELECTRONIC SYSTEMS

BACKGROUND

1. Field

The disclosed embodiments relate to techniques for diagnosing causes of anomalies within electronic systems, and more particularly to techniques for resolving a "No-Fault-Found" (NFF) condition in electronic systems.

2. Description Of Related Art

As electronic commerce grows increasingly more prevalent, businesses are increasingly relying on electronic systems, such as complex embedded real time systems, to process ever-larger volumes of electronic transactions. For instance, machines, such as an aircraft and other machines having complex embedded systems used for example in industrial processes, medical imaging, telecommunications, aerospace applications, and power generation, typically include controls and sensors for monitoring the various systems and subsystems of the machine and generating a fault indication when an anomalous operating condition occurs. Because the malfunction can impair the ability of the owner to conduct business efficiently and cost effectively, it is essential to accurately diagnose and quickly repair the machine.

However, currently when such complex systems fail, it is often due to an intermittent failure. During such failures, it is common for components, subsystems, or entire computer systems/embedded systems to indicate they have failed by either 'crashing' or otherwise halting processing, with or without writing failure messages to a system log file. "No-Fault-Found" (NFF) events arise when a service engineer is dispatched to repair a failed embedded system (or when the failed embedded system is returned to the manufacturer) and the embedded system runs normally with no indication of a problem. Thus, a common problem occurs when such a machine having a complex embedded system is returned for service due to failures identified by the customer, which cannot be replicated upon return to a production facility for the machine. Such machine units may appear fine, but actually have problems that required conditions that could not be replicated in the production facility (e.g., Thermal Transient; or a transient condition such as a Single Event Upset (SEU) that the system sees resulting in a fault). This may result in a cycle of units being shipped and returned. Ultimately, this cycle results in customer dissatisfaction, and additional expenses for troubleshooting, and material scrap.

It is known that to determine what caused a failure requires data. However, data collection, review and analysis are historically very expensive to implement within a real-time system, or offline. This is due to the fact that huge amounts of data and/or hardware/software are required. When units are returned and the factory is unable to reproduce the fault, additional troubleshooting is performed. Current known solutions require capturing large amounts of data, or execution of a wide range of tests to attempt to recreate unknown, but possible operation scenarios, requiring significant computing resource intensive post-processing of the data to possibly determine a cause of fault.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to an apparatus and method for automatically monitoring I/O interfaces and internal functions of an embedded system to detect and report abnormalities and faults, while capturing data for the specific failure and I/O interface or internal functions in real time. In accordance with the illustrated embodiments, utilized is a machine learning hardware module which is implemented to monitor same I/O interfaces or internal functions in real time as the operating system of the embedded system to detect abnormalities, and record a minimal amount of data necessary for the specified targeted anomaly. This provides a production/maintenance facility of the embedded system with the precise instance of the failure event and the applicable data associated with the failure event as it occurred so as to indicate what was happening in real time regarding when the failure occurred. This eliminates the prior art requirement for extensive data collection, transmission, data post processing, and expensive related hardware and/or software.

To achieve these and other advantages and in accordance with the purpose of the illustrated embodiments, in one aspect, described is a computing method and device for detecting an anomaly event in a hardware-based machine learning anomaly event detector. Data is received from a plurality of input/output ports/terminals/interface (I/O) or internal functions, wherein the received data of each I/O is associated with a certain sensor, effector or internal function. The received data from the plurality of I/O's is analyzed to determine the occurrence of an anomaly event for data from one of the plurality of I/O's. This analysis includes using machine learning techniques dynamically programmed to detect an anomaly event for the I/O data being analyzed by using predetermined parameter values. The predetermined parameter values are retrieved from memory, and are associated with the I/O data being analyzed. Stored in memory for subsequent analysis is at least a portion of the received data from the I/O data being analyzed accompanied with associated neural network output when it is determined an anomaly event occurred for the I/O data being analyzed using the machine learning techniques.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments. The following description is presented to enable any person skilled in the art to make and use the illustrated embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The word "exemplary" is used herein to mean "serving as an example, instance, or illustration." Any embodiment described herein as "exemplary" is not necessarily to be construed as preferred or advantageous over other embodiments Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below- described embodiments. Accordingly, the embodiments described herein are not to be limited by what has been particularly shown and described, except as indicated by the appended claims.

In accordance with the illustrated embodiments of the present disclosure, described below is an apparatus, system, method, and a machine learning architecture, preferably implemented on a semiconductor device, such as a Field Programmable Gate Array (FPGA), for use with the embedded systems configured and operable to diagnose a failure event in an embedded system. In particular, these techniques may be used to mitigate the occurrence of a "No-Fault-Found" (NFF) conditions. It is thus an object of the illustrated embodiments of the present disclosure to provide a minimally invasive embedded hardware solution that automatically monitors I/O interfaces or internal functions of an embedded system to detect and report abnormalities and faults, while capturing the data surrounding the specific failure and specific I/O in real time such that when an embedded system is returned to a production/maintenance facility, a precise reason and failure scenario is known, or the data specific to the failure event is provided to assist in the understanding of the failure event. Preferably, the diagnostic, control and/or data management system 10 (hereinafter for ease of description is referred to as a "diagnostic system") of the illustrated embodiments utilize a single, machine learning hardware implementation configured and operable monitor the same I/O interfaces or internal functions in real time as the operating system of the embedded system to detect data abnormalities (e.g., an anomaly event) while capturing a minimal amount of data relating to the anomaly event. This capturing of an anomaly event and related data in turn provides a factory/maintenance facility with an exact instance of the failure and the applicable data surrounding the failure when it occurred indicating what was happening in real time when the failure occurred. Thus, this eliminates the need for extensive data collection, transmission, data post processing, and extensive software and/or hardware expensive solutions.

As described further below, the diagnostic system 10 in accordance with the illustrated embodiments is configured and operable to detect a scenario leading to a fault event and record the relevant data for understanding the conditions resulting in the fault prior to the operating system of the embedded system detecting the fault event. For example, a transient condition (e.g., Thermal Transient) in the environment of operation of the embedded system (e.g., an aircraft) may cause a sensor component input to rapidly slew up. A present-day operating system will only flag a fault when the input finally exceeds a threshold but not the transient condition leading to the fault event (a threshold being exceeded). In contrast, the diagnostic system 10 of the present disclosure is configured and operable to determine, for example, that a rapid transient on the input is an abnormal operating condition prior to the fault detection so as to cause the data relating to the event to be recorded, thereby providing insight to the production/maintenance facility of the embedded system regarding the operating conditions that were occurring leading up to the failure event. In yet another example, the fault thresholds of the operating system are intentionally set wide to accommodate the range of tolerances and operating conditions. The diagnostic system 10 of the present disclosure is configured and operable to detect anomalous behavior much earlier by utilizing the normal operating conditions unique to each embedded system and has the ability to determine anomalous behavior dynamically, based on the operating condition, whereby the diagnostic system 10 of the present disclosure provides dynamically changing fault thresholds as the operating conditions change for the embedded system (e.g., implemented in an aircraft).

It is to be appreciated that while an illustrated embodiment is described with reference to an aircraft, it is to be understood the diagnostic system 10 can be used in conjunction with any machine where the operational parameters of the machine are monitored. Exemplary applications include a wide variety of electronic devices and systems including: medical diagnostic equipment, telecommunications systems, aerospace systems, and like devices or systems that include one or more processors or processor cores.

Described now are certain illustrated embodiments of an apparatus, system, a method, and machine learning architecture for diagnosing a failure in the computer embedded system, such as an aircraft. Currently, embedded systems are often returned from the field that allegedly have an NFF condition. In the discussion that follows, a technique is described that facilitates the identification of the "proper operating" embedded systems, and distinguishes these "proper operating" embedded systems from returns that have an actual NFF condition. It is to be understood and appreciated, NFF conditions can result from a variety of degradation mechanisms, including: transient/intermittent faults; data skewing, threshold limits on noisy physical variables; vibration-accelerated degradation modes; and/or sensor degradation events. Thus an object of the present disclosure is facilitating diagnosis of an underlying problem, and reducing or eliminating the possibility of mislabeling a failure as a NFF condition.

Figure 1:
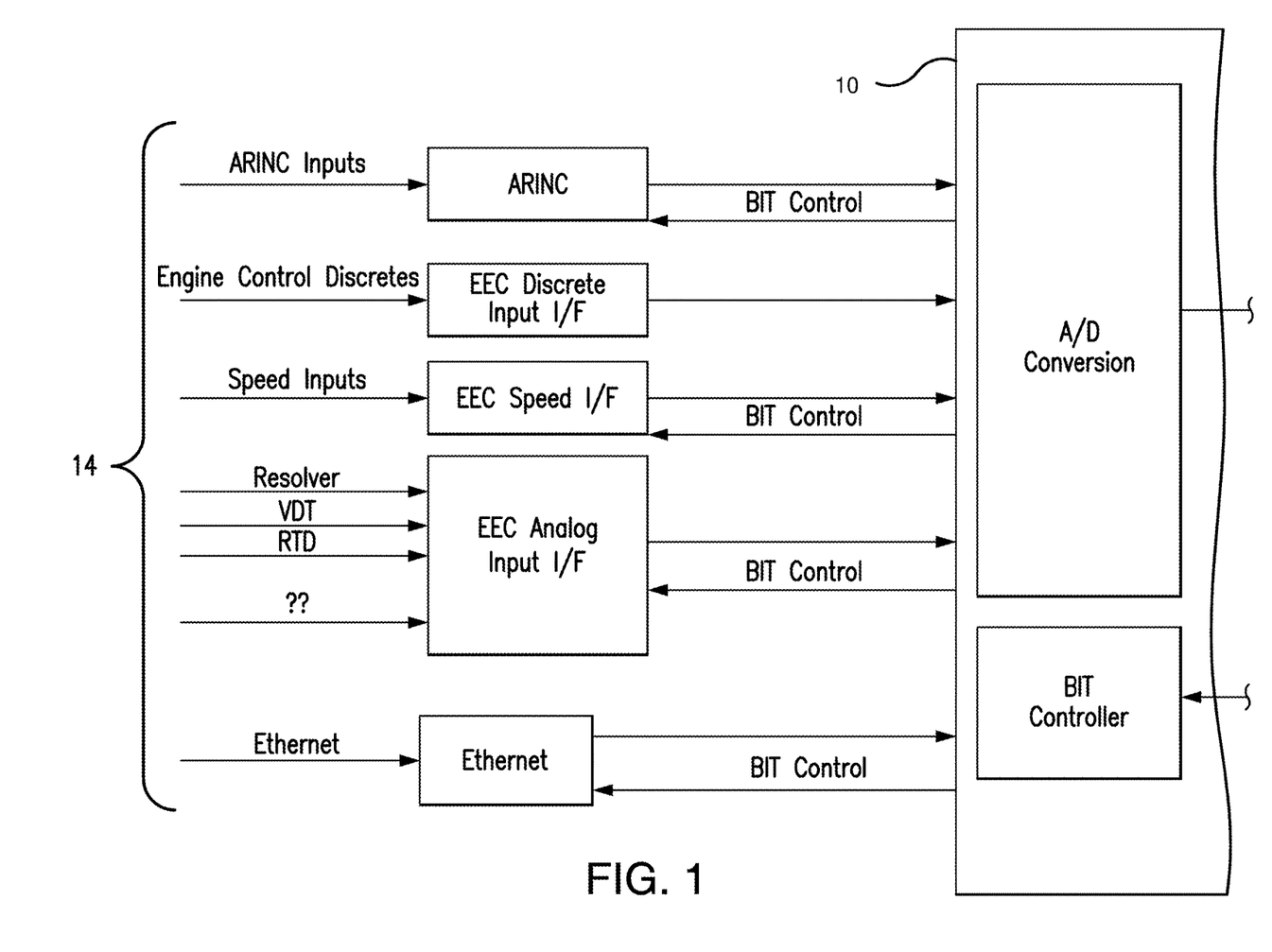
FIG. 1 is a generalized schematic illustration of a diagnostic, control and/or data management system in accordance with certain illustrated embodiments.

With reference now to FIG. 1, and in accordance with illustrated embodiments of the present disclosure, a diagnostic system module utilizing machine learning techniques (hereinafter referred to as a "NFF Monitor 100) is preferably integrated into a Field Programmable Gate Array (FPGA) 12 of the operating system of the embedded system (e.g., an aircraft). The NFF Monitor 100 is preferably configured and operable to detect and record NFF events, which for instance are often caused due to a transient nature or brief environmental condition subjected upon the operating system of the embedded system. It is to be appreciated the FPGA 12 is operable for I/O data collection for a plurality of I/O interfaces or internal functions 14 associated with the embedded system. Preferably the NFF Monitor 100 is integrated with the FPGA 12 processing I/O data 14, so as to preferably have the same I/O data 14 that is passed to the operating system for control provided to it. Preferably, all I/O 14 data, plus BIT information, is passed to the NFF Monitor 100 along with the normal path that they follow, as best shown in FIG. 1.

The NFF Monitor 100 of the illustrated embodiments is preferably trained using machine learning techniques to detect normal operational boundaries of the I/O data 14 during the design and development processes of the embedded system prior to its production. As described further below with reference to FIG. 3, in operation, as the NFF Monitor 100 detects abnormal operation impacted upon the operating system, it is configured and operational to record the specific I/O data 14 for those I/O interfaces or internal functions possessing the data leading up to, and after, the abnormality event. Preferably, I/O data 14 is captured (e.g., via NFF Monitor Memory 110) if the operating system flags a fault event. It is thus to be appreciated that since data processing is performed relatively slowly by the operating system, compared to the speed of the FPGA's 12 ability to calculate, the I/O data 14, along with the I/O specific weights and coefficients for the ML algorithm (e.g., provided via NFF Monitor Memory 110), is preferably multiplexed into the Machine Learning (ML) algorithm of the NFF Monitor 100 to conserve computing resources. For instance, short periods of I/O data is collected for each I/O interface of internal function 14, which is then passed to the ML NFF Monitor 100 for performing anomaly detection, as described further below. It is to be appreciated and understood that operation outside of the normal operational boundaries, as well as specific threshold exceedances unique to each I/O 14, is preferably utilized as detection mechanisms.

Figure 2:
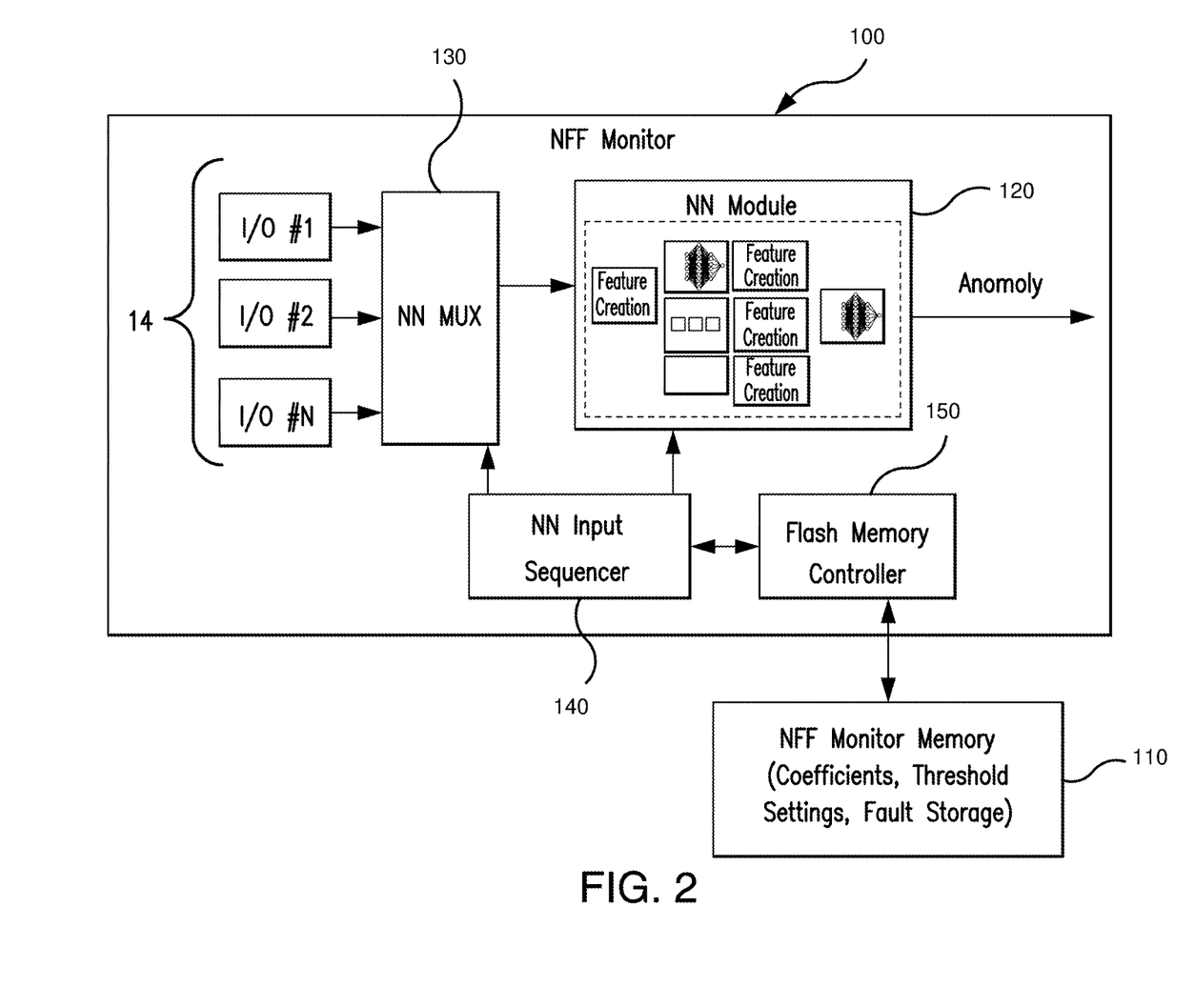
FIG. 2 is a generalized schematic illustration of a No Fault Found (NFF) monitor device integrated with the diagnostic, control and/or data management system of FIG. 1 in accordance with certain illustrated embodiments.

With specific now to FIG. 2, depicted is a generalized block diagram illustrating the architecture of the NFF Monitor 100, which is integrated with the I/O interfaces or internal functions 14 of the FPGA 12 (FIG. 1). The NFF Monitor 100 in accordance with the illustrated embodiments of the present disclosure preferably implements one or multiple instantiations of the ML Neural Network (NN) architecture (NN Module 120). Examples of such ML NN architecture can be found in commonly assigned U.S. Patent Publications Nos. 2021/0182727 (Real Time Output Control in Hardware Based on Machine Learning), and 2021/0181694 (Real Time Output Control Based Machine Learning Hardware Implementation), the contents of each are hereby incorporated by reference.

The NFF Monitor 100 further includes a NN Multiplexor 130 configured and operable to cycle the system I/O 14 (e.g., I/O #1, I/O #2 and #3) through the NN Module 120, which is preferably coupled to a NN Input Sequencer 140 configured and operable to control the cycling of the I/O 14 through the NN Module 120. It is to be appreciated that while the NFF Monitor 100 described in accordance with the illustrated embodiment of FIG. 1 includes NN Multiplexor 130 switches in each I/O independently such that targeted I/O 14 (e.g., I/O #1, I/O #2 and I/O #3) being assessed by the NN Module 120 is individually selected, it is thus to be understood that in many operational scenarios for the NFF Monitor 100, additional I/O 14 signals will be required to be included as inputs to aid in the NN calculations, and accuracy of results produced by the NN module 120. Hence, the exact I/O 14 required per input to the NN module 120 are determined during development whereby the specific I/O complement required per targeted I/O 14 to be assessed are stored in memory 110 with associated weights and coefficients. This information is preferably read and acted upon at the same time in the flow as the weights and coefficients. It is to be further understood and appreciated that the actual implementation of the NFF module 120 may not require an NN Multiplexor 130, as the same functionality may be accomplished by setting the NN weights for unused inputs to 0 for a given targeted I/O 14 to be processed. It is thus a purpose of the present illustrated embodiment of FIG. 2 to depict the NN Multiplexor 130 for illustrating the switching of the NN module 120 from one I/O input to the next in accordance with an exemplary embodiment only.

Further preferably included in the NN Monitor 100 is a Flash Memory Controller 150 coupled the NN Input Sequencer 140, configured and operable to read coefficients and weights, as well as store the fault data upon detection, from an external memory module 110. It is to be appreciated the external memory module 110 enables the FPGA implementation to remain constant for any coupled computer control embedded system and I/O 14 by changing the weights and coefficients utilized by the NN Module 120 so as to change the personality and operational functionality of the neural network implemented in the NN Module 120. For instance, and as demonstrated in the aforesaid commonly assigned patent applications incorporated herein, by changing the weights and coefficients (e.g., as stored in memory 110), the neural network implemented in the NN Module 120 is functional to implement any relevant anomaly detection algorithm relevant to an operating system of a computer embedded system (e.g., an aircraft).

It is to be appreciated that the development of the aforementioned NN weights and coefficients preferably occurs in the design and development phase regarding an embedded system. For instance, during such design and development phase, operating data is collected via both simulation, lab testing, qualification testing, on wing testing (e.g., when the embedded system is an aircraft), and other test conditions. It is noted the more test data and operating environments available, the more resilient the neural network anomaly detection is able to be trained for the NN module 120. It is to be further appreciated that over the life of an embedded system (e.g., an aircraft), as more test data is collected, the neural network capability of the NN module 120 can be upgraded by loading new coefficients and weights into the memory 110 without having to introduce any additional hardware changes. Thus, this data is utilized to train the machine learning neural network of the NN module 120 relative to the proper, acceptable operating range of each I/O 14 so as detect when I/O 14 data deviates from its expected operation under operating conditions. Note the normal, expected operating range may differ under different operating circumstances, thus the need for data from as many operating conditions as possible is desirable. It is to be understood however, it is not necessary the data include all failure modes as the neural network of the NN module 120 need not be trained with all failure conditions. However, the more normal and faulty conditions it is trained with, the better it will be able to identify unexpected failure conditions.

With specific regard to training the machine learning neural network of the NN module 120 utilizing coefficients and weights stored memory 110, for each I/O 14, key characteristics are preferably identified. For instance, these key characteristics preferably includes the triggers that cause the system to trigger a system fault, and additional key characteristics based on the I/O 14. Examples of these key characteristics are: AC Exc (Vrms nom, Vpk noise, Vthd); DC Exc (Vnom, Vnoise, Vmean, Vstd); Vin DC (Normal Input—Vnoise, Rate of Change; Vin DC (BIT Input—Vnoise, Vnom, Vmean, Vstd); and Vin AC (Normal Input—Vrms nom, Vnoise, Vthd, Rate of Change. Preferably the neural network of NN module 120 is trained to monitor these key characteristics for abnormal behavior. The trained neural network coefficients and weights for each I/O 14 is preferably stored in the memory device 110 accessed by the NFF monitor 100, preferably integrated with the FPGA 12 of the embedded system.

In accordance with the illustrated embodiment of the present disclosure, the cycle rate of the NFF Monitor 100 is dependent upon the data rate of the coupled operating system, whereby if higher data throughput for a particular application is required than a single NN Module 120 can process, then additional NN Modules (e.g., preferably the same as NN Module 120) are preferably disposed in parallel to one another to enable processing of multiple I/O's 14 simultaneously so as to match the throughput needs of the operating system. It is to be understood the I/O data 14 provided to the NN Module 120 at the time of calculation is preferably the same I/O data 14 provided to the operating system to ensure the NN Module 120 is processing the same I/O data 14 the fault detection logic provided by the operating system is processing. It is to be appreciated that the NFF Monitor 100 typically collects I/O data 14 at a faster rate than the operating system utilizes it, and this additional data thus be temporarily collected between NN cycles in the NN Module 120 in the scenario an anomaly event is detected so as to enable it to be permanently stored as evidence of the operational conditions leading up to the fault condition.

As described further below, the NN Module 120 is operational and configured to detect abnormal operation (e.g., an anomaly event) of, for example, a component of the embedded system (e.g., a sensor component of an aircraft) via the machine learning algorithm of the NN Module 120 whereby at least a portion of the I/O data 14 collected, and the neural network results pertaining to the detected anomaly event (e.g., data slewing), are preferably stored in memory 110 so as to be accessible to a production/maintenance facility (associated with the embedded system) in the event the operating system set a fault flag. However, and further in accordance with the illustrated embodiments of the present disclosure, alternatively, the aforesaid I/O data 14 is stored in memory 110 regardless of the status of the operating system, such as in the scenario when the operating system does not have sufficient time to respond once a system fault has been detected resulting in a reset condition of a faulty component. Additionally, storage of abnormal I/O data 14 may be desirable so that abnormal operating conditions detected during operation of the embedded system (e.g., flight of an aircraft) which did not flag a system fault would nevertheless be available upon return of the embedded system for various conditions. For instance, this enables engineering personnel to assess impacts of the condition identified by the detected anomaly event on expected operation or use cases. It is to be appreciated that abnormalities are not normally expected, and significant memory would not be required, but memory (e.g., 110) can be scaled to any size desired for the application.

Figure 3:
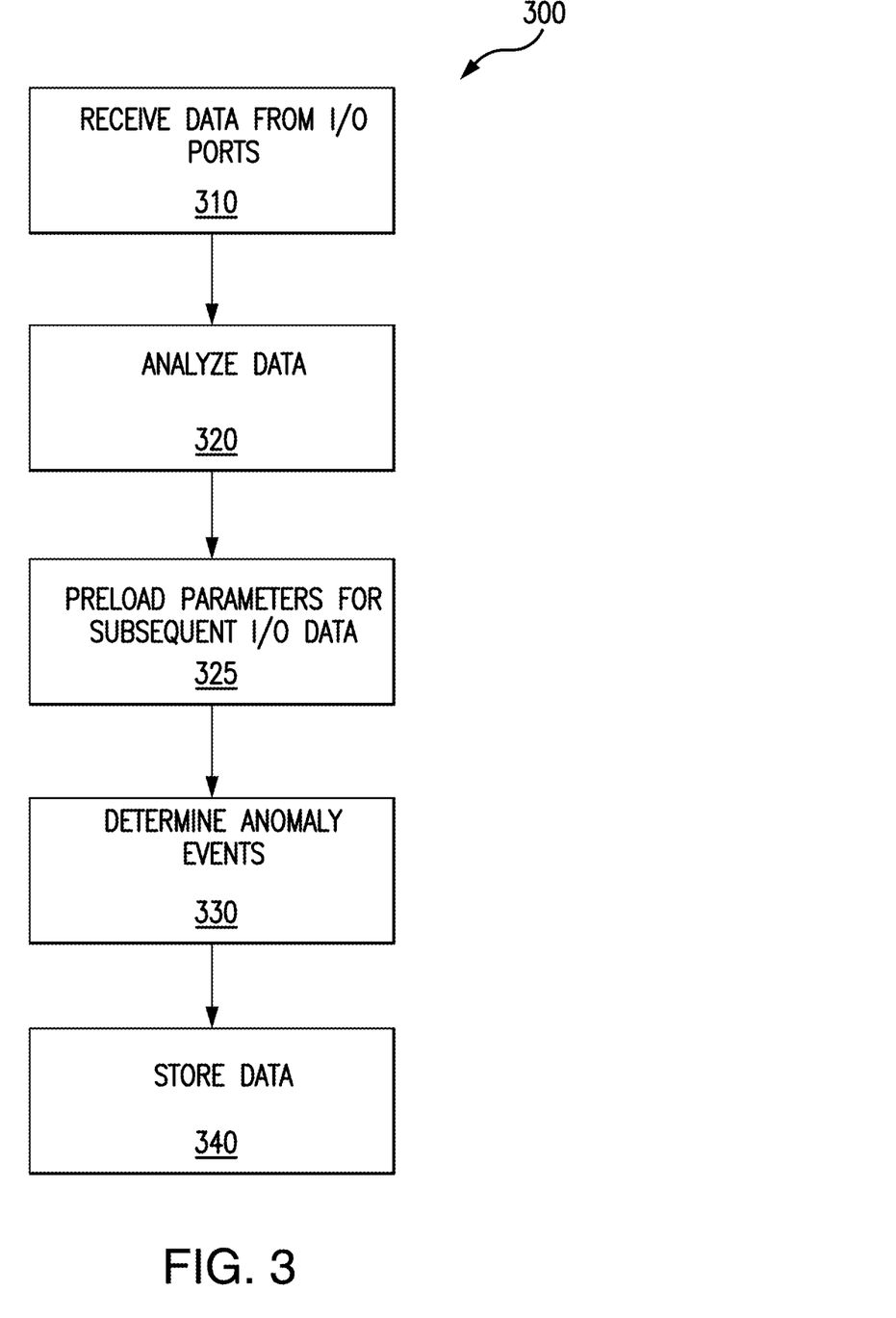
FIG. 3 illustrates a method of operation of the NFF monitor device of FIG. 2 in accordance with certain illustrated embodiments.

With system level components being described above with reference to FIGS. 1 and 2, reference now to FIG. 3 (and with continued reference to FIGS. 1 and 2), in accordance with the illustrated embodiments, depicted is an exemplary and non-limiting flowchart depicting a method 300 of operation for detecting anomalous behavior by utilizing the normal operating conditions unique to an embedded system by determining anomalous behavior dynamically, preferably based on operating conditions of the embedded system. Before turning to description of FIG. 3, it is noted that the flow diagram in FIG. 3 illustrates exemplary operational steps carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

Starting at step 310, data is received in the NFF Monitor 100 from a plurality of I/O interfaces or internal functions 14, wherein the received data of each I/O interface or internal function 14 is associated with a certain sensor or effector. Next, at step 320, the received I/O data is analyzed in the Neural Network Module 120 of the NFF Monitor 100, whereby an anomaly event is detected for data from one of the plurality of I/O's 14 using machine learning techniques preferably dynamically programmed to detect an anomaly event for the I/O data being analyzed by using predetermined parameter values, retrieved from memory 110, associated with the I/O data currently being analyzed, step 330. It is to be understood an anomaly event preferably relates to an aforesaid NFF condition. Further, the machine learning techniques preferably utilize a neural network (e.g., the NN Module 120) utilizing configurable weights and biases associated with the I/O data being analyzed to determine whether an anomaly event is present for the I/O data being analyzed, wherein the configurable weights and biases are preferably retrieved from memory 110 by a supporting memory controller and/or time sequencer 140. For instance, the configurable weights and biases associated with the I/O data being analyzed may include neural net weights, bias and feature creation coefficients associated with the I/O data being analyzed. Preferably, a neural network sequencer 140 switches the weights and biases of the neural network to a subsequent I/O to be analyzed. It is noted the determined anomaly event may not correlate to a fault event triggered for the I/O data being analyzed.

In accordance with the illustrated embodiments of the present disclosure, it is to be appreciated and understood that simultaneously while an anomaly event is being determined for the I/O data being analyzed (steps 320, 330), preloaded from the memory 110 in step 325 is subsequent predetermined parameter values associated with subsequent I/O data from the plurality of I/O's to be analyzed so as to determine whether an anomaly event is present in the subsequent I/O data to be analyzed after an anomaly event determination is made for the I/O data being analyzed (steps 320, 330).

And at step 340, stored in memory 110 for subsequent analysis is at least a portion of the received data from the I/O data being analyzed and associated neural network output when it is determined an anomaly event occurred for the I/O data being analyzed using the machine learning techniques. It is to be understood and appreciated that in accordance with the illustrated embodiments of the present disclosure a triggered fault event may also be detected by the NFF Monitor 100 that is associated with the I/O data being analyzed. Thus, also stored in the memory 110 for subsequent analysis is the detected triggered fault event in association with the data from the I/O data being analyzed when it is determined an anomaly event also occurred for the I/O data being analyzed using the machine learning techniques.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of the present disclosure, and not in limitation thereof.

In summary, various embodiments of the present illustrated embodiments disclose a novel approach for detecting data deviations in an embedded system from normal/expected operation regardless of the failure mechanism, environment or trigger.

An exemplary advantage being the elimination of NFF events which decreases customer relationship management related production handling costs, while also eliminating the cycling of units through the field and thus increase customer satisfaction.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented in a Field Programmable Array (FPGA), but is not to be understood to be limited thereto as it may applied to any applicable application, including, or not including, software. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting an anomaly event in a hardware-based machine learning anomaly event detector, comprising:

receiving data from a plurality of input/output ports (I/O), wherein the received data of each I/O is associated with a certain sensor or effector;

analyzing data from the plurality of I/O's;

determining an anomaly event for data from one of the plurality of I/O's using machine learning techniques dynamically programmed to detect an anomaly event for the I/O data being analyzed by using predetermined parameter values, retrieved from memory, associated with the I/O data being analyzed, wherein the machine learning techniques utilize a neural network with configurable weights and biases associated with the I/O data being analyzed to determine whether an anomaly event is present for the I/O data being analyzed wherein the neural network is coupled to the plurality of I/O's whereby a neural network sequencer switches the weights and biases of the neural network to a subsequent I/O to be analyzed; and storing, in memory for subsequent analysis, at least a portion of the received data from the I/O data being analyzed and associated neural network output when it is determined an anomaly event occurred for the I/O data being analyzed using the machine learning techniques.

2. The method as recited in claim 1, wherein the anomaly event relates to a No Fault Found (NFF) condition.

3. The method as recited in claim 2, further including:
detecting a triggered fault event associated with the I/O data being analyzed; and
storing, in the memory for subsequent analysis, the detected triggered fault event in association with the data from the I/O data being analyzed when it is determined an anomaly event also occurred for the I/O data being analyzed using the machine learning techniques.

4. The method as recited in claim 1, wherein the configurable weights and biases are retrieved from memory by a supporting memory controller and/or time sequencer.

5. The method as recited in claim 1, further including while an anomaly event is being determined for the I/O data being analyzed, preloading from the memory subsequent predetermined parameter values associated with subsequent I/O data, from the plurality of I/O's, to be analyzed to determine whether an anomaly event is present in the subsequent I/O data to be analyzed after an anomaly event determination is made for the I/O data being analyzed.

6. The method as recited in claim 1, wherein the predetermined parameter values associated with the I/O data being analyzed retrieved from memory include neural net weights, bias and feature creation coefficients associated with the I/O data being analyzed.

7. The method as recited in claim 1, wherein the data from the plurality of I/O's is received by a Field Programmable Gate Array.

8. The method as recited in claim 1, wherein the hardware-based machine learning anomaly event detector is coupled to an aircraft.

9. The method as recited in claim 1, wherein the determined anomaly event does not correlate to a fault event triggered for the I/O data being analyzed.

10. The method as recited in claim 9, wherein the determined anomaly event includes data skewing.

11. The method as recited in claim 9, wherein the determined anomaly event includes detection of abnormal in-range operation due to environment conditions.

12. A computer embedded system for detecting anomaly events in a machine, comprising:
a Field Programmable Gate Array (FPGA) configured to:
receive data from a plurality of input/output ports (I/O), wherein the received data of each I/O is associated with a certain sensor or effector;
analyze data from the plurality of I/O's;
determine an anomaly event for data from one of the plurality of I/O's using machine learning techniques dynamically programmed to detect an anomaly event for the I/O data being analyzed by using predetermined parameter values, retrieved from memory, associated with the I/O data being analyzed, wherein the machine learning techniques utilize a neural network with configurable weights and biases associated with the I/O data being analyzed to determine whether an anomaly event is present for the I/O data being analyzed wherein the neural network is coupled to the plurality of I/O's whereby a neural network sequencer switches the weights and biases of the neural network to a subsequent I/O to be analyzed; and
store, in memory for subsequent analysis, at least a portion of the received data from the I/O data being analyzed and associated neural network output when it is determined an anomaly event occurred for the I/O data being analyzed using the machine learning techniques.

13. The computer embedded system as recited in claim 12, wherein the anomaly event relates to a No Fault Found (NFF) condition.

14. The computer embedded system as recited in claim 13, wherein the FPGA is further configured to:
detect a triggered fault event associated with the I/O data being analyzed; and
store, in the memory for subsequent analysis, the detected triggered fault event in association with the data from the I/O data being analyzed when it is determined an anomaly event also occurred for the I/O data being analyzed using the machine learning techniques.

15. The computing device as recited in claim 12, wherein the machine learning techniques utilize a neural network with configurable weights and biases associated with the I/O data being analyzed to determine whether an anomaly event is present for the I/O data being analyzed.

16. The computing device as recited in claim 15, wherein the configurable weights and biases are retrieved from memory by a supporting memory controller and/or time sequencer.

17. The computing device as recited in claim 15, wherein the FPGA is further configured to, while an anomaly event is being determined for the I/O data being analyzed, preload from the memory subsequent predetermined parameter values associated with subsequent I/O data, from the plurality of I/O's, to be analyzed to determine whether an anomaly event is present in the subsequent I/O data to be analyzed after an anomaly event determination is made for the I/O data being analyzed.

* * * * *